No. 835,089. PATENTED NOV. 6, 1906.
C. WILLMS.
FLOAT FOR FLUSHING TANKS.
APPLICATION FILED OCT. 21, 1905.
2 SHEETS—SHEET 1.
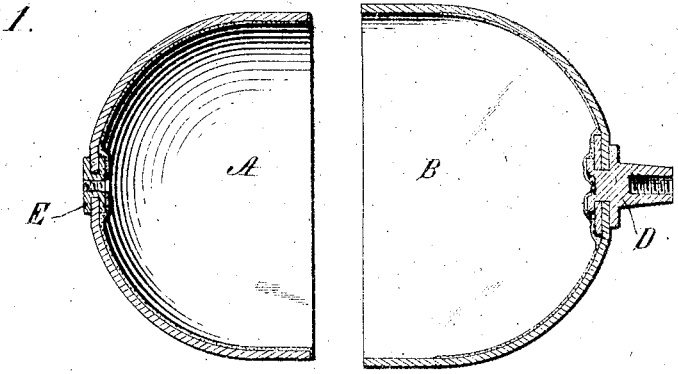
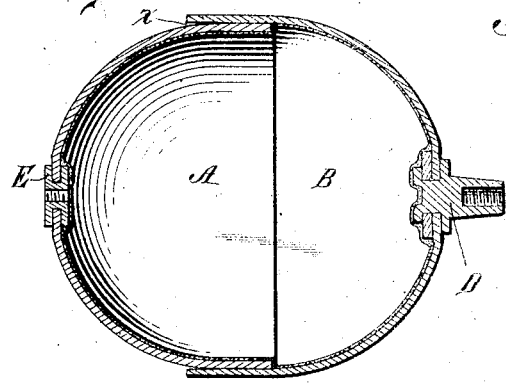
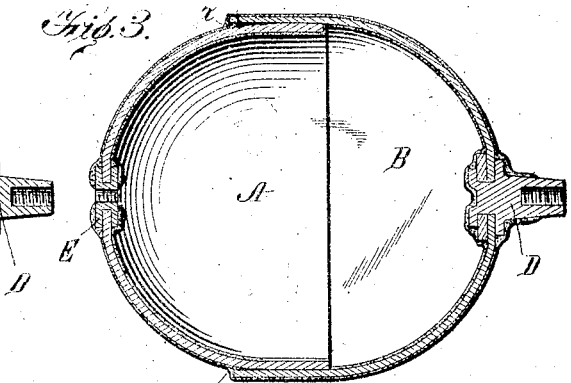
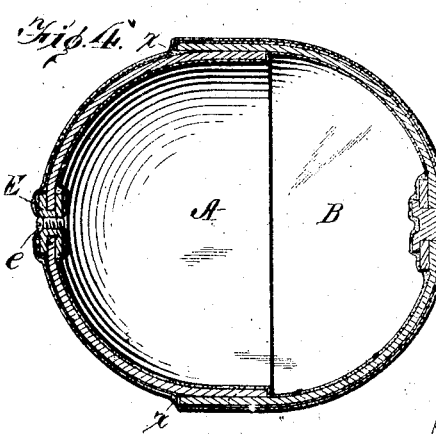
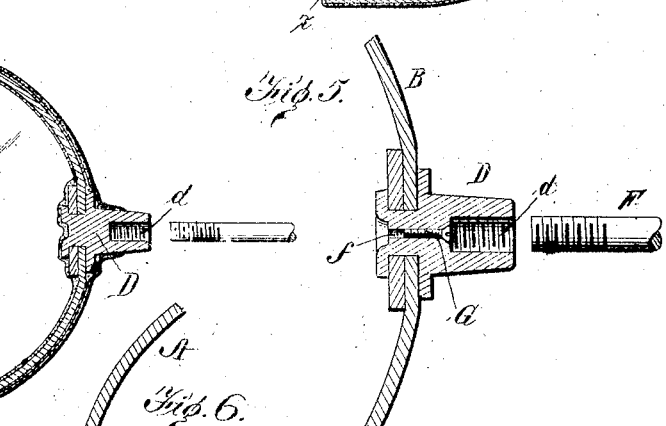
WITNESSES
Paul J. Gathmann
E. B. Bruner
INVENTOR
Charles Willms
BY HIS ATTORNEYS.
Baldwin & Wight

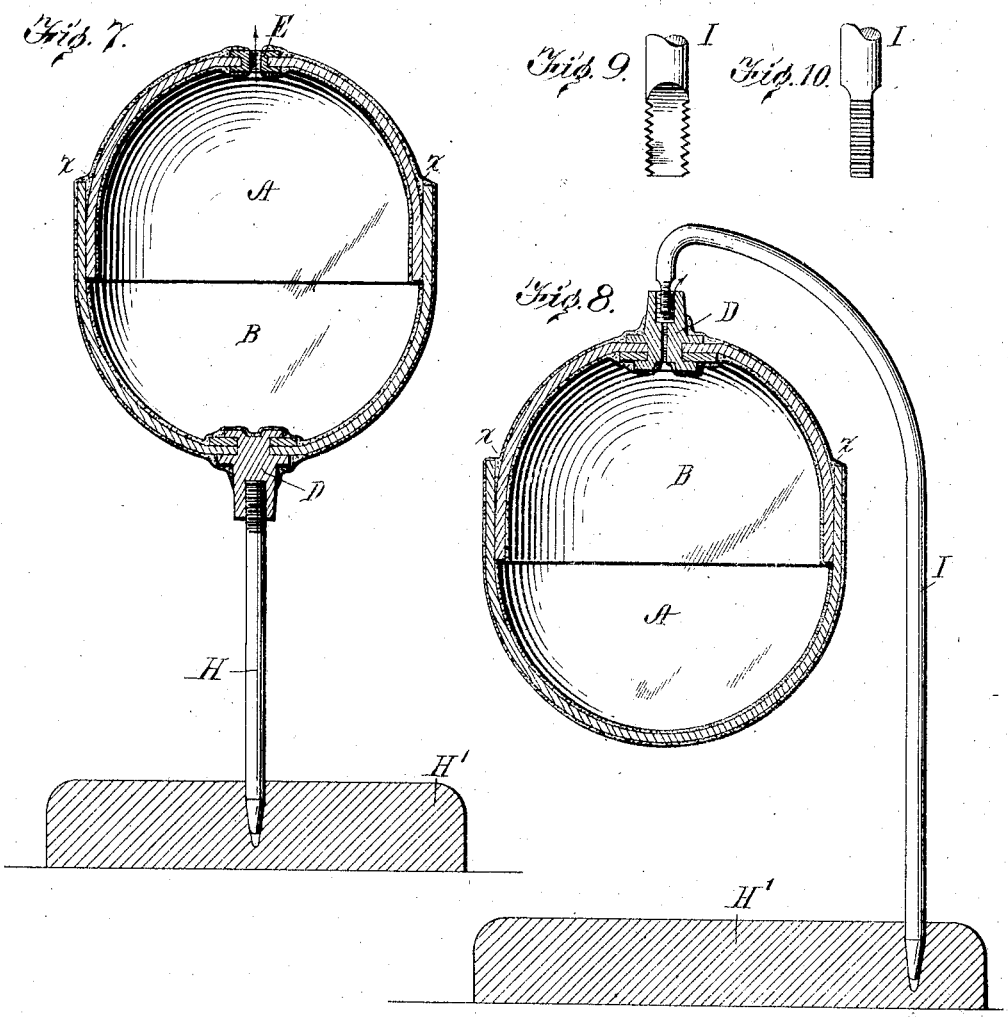

UNITED STATES PATENT OFFICE.

CHARLES WILLMS, OF BALTIMORE, MARYLAND.

FLOAT FOR FLUSHING-TANKS.

No. 835,089.  Specification of Letters Patent.  Patented Nov. 6, 1906.

Application filed October 21, 1905. Serial No. 283,792.

*To all whom it may concern:*

Be it known that I, CHARLES WILLMS, a citizen of the United States, residing in the city of Baltimore and State of Maryland, have invented certain new and useful Improvements in Floats for Flushing-Tanks, of which the following is a specification.

Heretofore floats for flushing-tanks have usually been made of metal, such as copper; but such floats are often soon destroyed by the corrosive action of alkalies or other substances found in the native waters of many parts of the country. Glass floats have to a small extent been substituted for those made of copper or other metal; but such floats are liable to be broken in handling or to crack and leak when subjected to variations in temperature.

The object of my invention is to provide a float which shall combine the advantages of the metal float with those made of glass, but shall not have any of their objections.

My invention consists in providing a metal float covered with enamel in a novel way, whereby leakage is absolutely prevented, the metal is protected from the action of substances which tend to corrode it, and which cannot be easily broken.

It will be understood that in order to enamel a metal float it is necessary to first prepare the metal to receive the enameling composition in a pickling-bath. Floats are usually made of two metal sections which are joined by a connection designed to be water-tight; but it is extremely difficult to obtain an absolutely water-tight joint by spinning, soldering, or the usual methods. Hence it is difficult to properly pickle a metal float made in the usual way without allowing some of the pickling-liquid to enter the float and corrode it.

According to my invention I form the two sections of the float in such manner that they may be joined without the usual spinning or compressing operation to unite them, and I first treat the sections before they are brought together in a pickling-bath to prepare them for the enameling process.

I prefer to enamel the float on both the inside and outside, although it is not essential that the inside of the float should be enameled. When the inside and outside of the float are enameled and after the sections have been pickled, I coat the inside thereof with an enameling composition which fluxes or fuses at a relatively high temperature. I then join the sections and coat them on the outside with the same kind of enameling composition. Then the float is baked or fired to produce a hard enamel interior and exterior coating.

In order to insure that the enamel coating is perfect or to cover up any defects in the first coating, I apply to the outside of the float a coating of enameling composition, fusing or fluxing at a lower temperature than that first employed, and the float thus covered is again fired until the enamel is properly formed. In this way a water-tight float is obtained, which is not affected by alkalies, acids, or other substances contained in the water, and even should any corrosive substance enter the float or be inclosed therein by any accident it will not tend to corrode, inasmuch as the interior of the float is thoroughly enameled.

In firing the float after the sections are joined the air within it is expanded, and were there no other vent or escape the air would leak past the joint of the sections and leave air-holes, which would remain in the finished article and the float would not be water-tight. In order to avoid this, I provide one of the float-sections with a specially-made vent or escape for the air. During the firing process the air passes out from the float through this opening, and when the firing is completed this hole is closed by a plug or stopper of any suitable kind.

There are other features of my invention which are illustrated in the accompanying drawings and which will be hereinafter specifically described.

Figure 1 shows in section the two parts of the float after a coat of enameling-paste has been applied to the inside thereof. Fig. 2 shows the two sections joined by a slip-joint. Fig. 3 shows the joined sections covered with an enameling-paste on both the inside and outside, in which condition the float is baked or fired. Fig. 4 shows how the outside of the float is covered with the second coat of enamel. Fig. 5 is a detail view in section and on an enlarged scale, illustrating one form of vent or air-escape that may be employed. Fig. 6 illustrates another form, while a third modification is shown in Figs. 1 to 4. Fig. 7 illustrates how the float may be supported while being baked when the vent is on that side of the float opposite the one containing the socket-piece for the valve-rod. Fig. 8 shows how the float is supported when the vent is formed in said socket-piece. Figs. 9 and 10 are detail views of that end of the supporting-rod which is connected with the float during firing. Figs. 11 and 12 show modified ways of joining the float-sections.

The sheet-metal sections A and B are in general of the usual construction; but, unlike other floats, they preferably have a connection with each other, which does not require spinning or swaging to unite them.

In Figs. 1 to 4 I have shown a slip-joint. The diameter of the section B near the joint is greater than that of the section A, and when the sections are brought together the parts will appear as shown in Fig. 2, leaving an annular recess or gutter $x$, for a purpose hereinafter described. Instead of such a slip-joint I may employ screw-threads C, (indicated in Fig. 11,) and one of the sections may be formed with an annular flange $a$ to limit the movement of the other section, and the other section is formed with a right-angle bend $b$, which overlaps the flange $a$, forming an annular recess or gutter $x$. This is for the purpose of taking a better hold on the enameling composition, or I may employ a slip-joint like that illustrated in Fig. 12, the flange $a$ and the bend $b$ in this figure corresponding with the parts similarly lettered in Fig. 11.

The socket-piece D of well-known construction is secured to the section B, and a vent is preferably provided in the other section. In Figs. 1 to 4 this vent is produced by attaching an eyelet E to the section A. The eyelet, it will be observed, is provided with a screw-threaded opening communicating with the interior of the float. Instead, however, of providing a vent in this way I may employ the construction shown in Fig. 6, where an eyelet E' is shown, but is not screw-threaded. In this case the eyelet-hole may be closed by any suitable composition or by a suitable stopper of rubber or other material. Another way of producing the vent is illustrated in Fig. 5, in which the threaded socket $d$ for the valve-rod F communicates with a passage $f$, leading to the interior of the float. In Fig. 5 this passage is shown as being closed by a screw G; but this may be easily removed. It is not in place during the firing operation, but is inserted afterward, as hereinafter described.

The float-sections A and B after the socket-piece D and the eyelet E (when one is used) are applied are subjected to a pickling-bath to render them perfectly clean and suitable to receive the enameling composition. After this the inside of the sections are preferably coated thoroughly with an enameling-paste which fluxes at a relatively high temperature. At the joint of the socket-piece with the section B and around the eyelet the composition is applied with special care in order to insure against any possibility of leakage. After this the two sections are joined in the manner indicated in Fig. 2 and are then coated on the outside with an enameling composition of the kind used to coat the inside. When thus coated, the parts will appear as indicated in Fig. 3, and it will be observed that the enameling composition completely covers the exterior of the float, more being applied in the gutter $x$ and around the socket-piece D and eyelet E than at other parts. In this condition the float is ready for firing, and it is preferably supported on a rod H, such as illustrated in Fig. 7, the rod being connected with a base H' and being screw-threaded at its upper end to connect with the socket-piece D. The base H' supporting the float may then be placed in a baking-oven and the float may be fired until the enameling coating on both the inside and outside are thoroughly baked. During this process of baking the air within the float expands; but it has a ready vent through the eyelet E, and the joint at $x$ is not injured. When the vent is made through the socket-piece D, the float is supported in the manner indicated in Fig. 8. In this case it will be observed that the rod I has a part overhanging the float and the overhanging end of the rod is screw-threaded and flattened or mutilated, so that while a firm connection may be made between the socket-piece and the supporting-rod vent-openings will be left, as indicated, for the escape of the expanding air. It will be observed that in both cases the vents are arranged at the top of the float, because the heated air tends to ascend, and it is thus allowed freely to escape.

If the float shown in Fig. 8 were reversed and supported on a rod, such as indicated at H in Fig. 7, the bent opening would be at the bottom and there would be a tendency for the expanding air to rise and escape around the joint $x$. The first coating of enamel composition is baked in the manner just described, and after this I apply another coating of enameling-paste, but one which fuses or fluxes at a lower temperature than that first employed in order that when fired the first coat will not melt. This second coating, as indicated in Fig. 4, is made to cover the entire outside of the float, being applied more plentifully at the joint of the sections which are specially made to receive it and around the socket-piece D and eyelet E. When thus coated, the float is again fired in the manner illustrated in Fig. 7 or Fig. 8.

I have described the ways now best known to me for carrying out my invention; but I wish it understood that the steps of the process herein described may be varied and the construction of the float may be changed without departing from my invention.

While I prefer to coat the inside of the float-sections, I find that this is not absolutely necessary. Other kinds of joints for the sections may be employed than those shown and described, and the vent for the float may be constructed or located in various ways, those shown and described, however, being preferred. As before stated, when the enameling process is completed the eyelet E or the passage $f$ is closed water-tight in any suitable way, either by a screw $e$ or G or other suitable means. In place of the eyelet the float may be merely reinforced and a vent-hole formed in the reinforced portion.

I claim as my invention—

1. A float comprising two sections enameled on both the inside and outside, joined together and then covered with another coat of enamel.

2. A float comprising two sections, first enameled on the inside, then joined together, then covered on the outside with enamel, and then coated with a second covering of enamel.

3. A float comprising two sections joined together, completely covered on the outside by an enamel fluxing at a relatively high temperature and then covered with an enamel fluxing at a lower temperature than that first employed.

4. A float made in two sections which overlap each other and provided with an annular recess or gutter, $x$, and a coating of enamel closing the joint, filling said recess and also covering the entire outside of the float.

5. A float made in two sections joined together and having the joint hermetically sealed by enamel, one of which sections is provided with a closed vent and said float being covered throughout its entire exterior with a coating of vitreous enamel.

6. A float comprising two sections to one of which a socket for the valve-rod is secured and which is covered on the inside over the joint of the socket with the float-section by an enamel fluxing at a relatively high temperature and a coating of enamel fluxing at a lower temperature applied to the outside of the float.

7. The herein-described process which consists in bringing together the two parts of a float, closing the joint of the two parts with an enameling composition, firing the float to produce the enamel, and simultaneously allowing the expanded air within the float to escape therethrough.

In testimony whereof I have hereunto subscribed my name.

CHARLES WILLMS.

Witnesses:
LLOYD B. WIGHT,
KARL FENNING.